US011809896B2

(12) United States Patent
Baset et al.

(10) Patent No.: US 11,809,896 B2
(45) Date of Patent: Nov. 7, 2023

(54) ANOMALOUS TRANSACTION COMMITMENT PREVENTION FOR DATABASE

(71) Applicant: International Business Machines Corporation, Armonk, NY (US)

(72) Inventors: Salman Abdul Baset, New York, NY (US); Qi Zhang, Elmsford, NY (US); Petr Novotny, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 16/422,954

(22) Filed: May 24, 2019

(65) Prior Publication Data

US 2020/0371833 A1 Nov. 26, 2020

(51) Int. Cl.
*G06F 9/46* (2006.01)
*H04L 9/06* (2006.01)
*G06F 16/23* (2019.01)
*H04L 9/00* (2022.01)

(52) U.S. Cl.
CPC .......... *G06F 9/466* (2013.01); *G06F 16/2379* (2019.01); *H04L 9/0637* (2013.01); *H04L 9/0643* (2013.01); *H04L 9/50* (2022.05); *H04L 2209/56* (2013.01)

(58) Field of Classification Search
CPC ... G06F 9/466; G06F 16/2379; H04L 9/0637; H04L 9/0643; H04L 9/50; H04L 2209/56
USPC ...................................................... 707/703
See application file for complete search history.

(56) References Cited

U.S. PATENT DOCUMENTS

| 8,176,159 | B2 | 5/2012 | Kashi |
| 8,707,431 | B2 | 4/2014 | Stephens et al. |
| 9,558,524 | B2 | 1/2017 | Madhu et al. |
| 9,818,089 | B2 | 11/2017 | Nosek et al. |
| 9,935,772 | B1 | 4/2018 | Madisetti et al. |
| 2009/0293121 | A1 | 11/2009 | Bigus et al. |
| 2012/0136676 | A1 | 5/2012 | Goodall et al. |
| 2014/0325643 | A1 | 10/2014 | Bart et al. |
| 2017/0034192 | A1 | 2/2017 | Schulman et al. |
| 2017/0250972 | A1* | 8/2017 | Ronda .................. H04L 9/0891 |
| 2017/0293917 | A1 | 10/2017 | Dhurandhar et al. |
| 2018/0196694 | A1 | 7/2018 | Banerjee et al. |
| 2018/0285838 | A1* | 10/2018 | Franaszek ............. H04L 9/3247 |
| 2019/0007424 | A1 | 1/2019 | Ford et al. |
| 2019/0034936 | A1* | 1/2019 | Nolan .................. G06Q 20/027 |
| 2019/0036906 | A1* | 1/2019 | Biyani ................... H04L 63/20 |
| 2019/0080407 | A1* | 3/2019 | Molinari ................ G06Q 20/06 |

(Continued)

OTHER PUBLICATIONS

List of IBM Patents or Patent Applications Treated as Related, Jun. 8, 2019.

(Continued)

*Primary Examiner* — Hosain T Alam
*Assistant Examiner* — Nicholas E Allen

(57) ABSTRACT

An example operation may include one or more of receiving, by a risk score module, a blockchain transaction proposal, obtaining transaction proposal data, obtaining external data, computing a risk score from the transaction proposal data and the external data, comparing the risk score to a risk score threshold, providing a commitment decision, based on the comparison, and one of committing or rejecting an endorsed transaction corresponding to the transaction proposal.

17 Claims, 21 Drawing Sheets

(56) References Cited

U.S. PATENT DOCUMENTS

| | | |
|---|---|---|
| 2019/0102850 A1* | 4/2019 | Wheeler .............. G06Q 20/405 |
| 2019/0103958 A1 | 4/2019 | Wu |
| 2019/0104196 A1* | 4/2019 | Li ......................... H04L 9/3239 |
| 2019/0132350 A1* | 5/2019 | Smith .............. G06Q 20/38215 |
| 2022/0138734 A1 | 5/2022 | Madisetti et al. |
| 2022/0138735 A1 | 5/2022 | Madisetti et al. |

OTHER PUBLICATIONS

Salman Abdul Baset et al., "Anomalous Transaction Detection for Database", U.S. Appl. No. 16/422,951, filed May 24, 2019 (a copy is not provided as this application is available to the Examiner).

\* cited by examiner

850

Quantum-Secured Blockchain
852

ANOMALOUS TRANSACTION COMMITMENT PREVENTION FOR DATABASE

TECHNICAL FIELD

This application generally relates to anomalous transaction detection in a database, and more particularly, to anomalous transaction commitment prevention for databases.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage. As such, what is needed is a solution that overcomes these drawbacks and limitations.

SUMMARY

One example embodiment provides a system that includes a blockchain client, configured to generate a transaction proposal, and a blockchain network, comprising a risk score module, configured to perform one or more of obtain transaction proposal data, obtain external data, compute a risk score from the transaction proposal data and the external data, compare the risk score to a risk score threshold, and provide a commitment decision based on the comparison, and a committer node or peer, configured to perform one or more of receive an endorsed transaction that corresponds to the transaction proposal, and one of commit the endorsed transaction to a blockchain of the blockchain network or reject the transaction, based on the commitment decision.

Another example embodiment provides a method that includes one or more of receiving, by a risk score module, a blockchain transaction proposal, obtaining transaction proposal data, obtaining external data, computing a risk score from the transaction proposal data and the external data, comparing the risk score to a risk score threshold, providing a commitment decision, based on the comparison, and one of committing or rejecting an endorsed transaction corresponding to the transaction proposal.

A further example embodiment provides a non-transitory computer readable medium comprising instructions, that when read by a processor, cause the processor to perform one or more of receiving, by a risk score module, a blockchain transaction proposal, obtaining transaction proposal data, obtaining external data, computing a risk score from the transaction proposal data and the external data, comparing the risk score to a risk score threshold, providing a commitment decision, based on the comparison, and one of committing or rejecting an endorsed transaction corresponding to the transaction proposal.

DETAILED DESCRIPTION

Figure 1A:
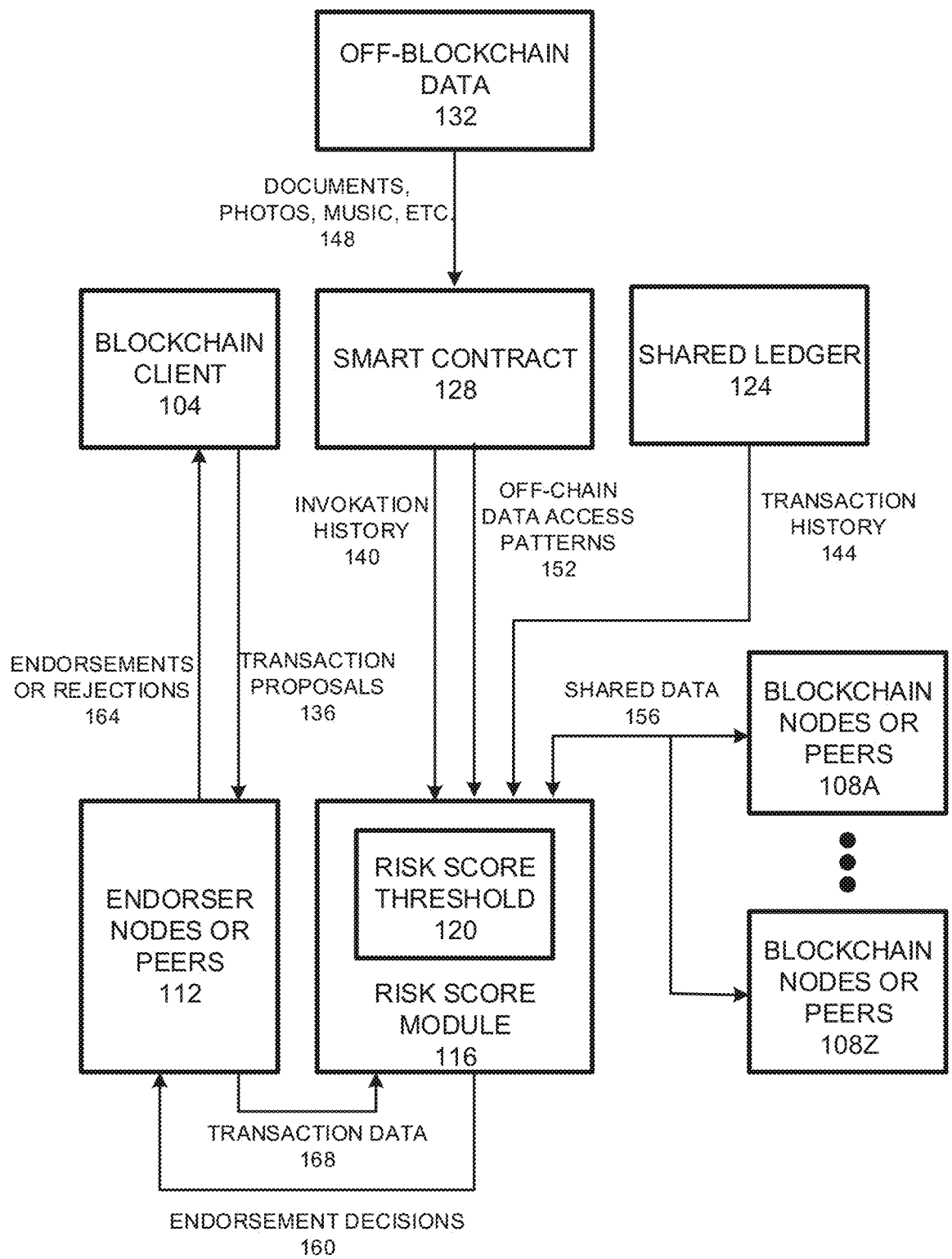
FIG. 1A illustrates a first network diagram of a risk scoring system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide anomalous transaction commitment prevention for databases.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some transactions being committed to a blockchain may be anomalous. This can happen due to a misconfigured device (e.g., an interne-of-things (IOT) device sending incorrect temperature once or repeatedly), a compromised user deliberately trying to send incorrect data to a blockchain, or a malfunction in a client application or a peer. In such cases, it may be desirable to identify a proactive mechanism to flag transactions before they are committed to a shared ledger and also find anomalous committed transactions.

For applications, examples of anomalous behaviors may include sending data of size 100 bytes between 9-11 AM for the previous two months, and suddenly sending 1 Kbytes of data between 10-11 PM, or an application usually invoking a smart contract every 5 seconds, and suddenly invoking the smart contract every second. For smart contracts, examples of anomalous behaviors may include invocation of a smart contract interrupted by a user (e.g., a system administrator uninstalling chaincode), a smart contract usually taking five seconds to finish, and suddenly taking 10 seconds to complete, a smart contract usually involving keys 1 through 5, and suddenly involving or creating keys 10 through 15. In another example, a financial smart contract may usually only write intensively to update invoice assets in a shared ledger, but suddenly starts to perform intensive reads towards the invoice assets. In another example, an IOT smart contract usually sends temperature values between 0 through 40 degrees, but it suddenly sends values above 100 degrees. In yet another example, the sizes of smart contract parameters usually varies between 100 and 1Kbytes, but it suddenly becomes 2 Mbytes. In a final example, a smart contract usually accepts 3 parameters, but it suddenly accepts only one parameter (i.e., the other two parameters are empty).

Some benefits of the instant solutions described and depicted herein include providing a new ability to monitor blockchain transactions and flag/identify anomalous transactions before they are committed to a shared ledger, and also to review committed anomalous transactions so that appropriate measures may be taken. The present application describes methods to create a risk scoring system for blockchain transactions, in order to mitigate the risk associated with misconfigured, compromised, or malfunctioning entities sending data to blockchains. The methods calculate risk score using off-chain and on-chain data to detect anomalous transactions, and use a risk score in the decision making of transaction endorsement. The risk score may be stored in a shared ledger for further analysis of transaction anomalous (anomalous thresholds may be changed). The present application also describes an approach to determine whether a committed transaction is anomalous or not.

It would not be possible for the disclosed methods and systems to be implemented in a traditional database instead of a blockchain. A node or peer will decide whether to endorse a transaction or not based on output of the risk score module. This process, especially for the endorsement, is closely coupled with the blockchain.

The disclosed methods and systems enhance the functionality of blockchain by adding a risk score module, which prevents malicious transactions to be stored in the blockchain shared ledger. New data is being stored in blocks of blockchains. The new data being stored is the historical metadata of the transactions, such as the issuer identities, the data access patterns of the transactions, the invocation frequencies, etc. These data items will be used by the risk score module to calculate the risk score of transactions and decide whether a transaction is anomalous or not.

FIG. 1A illustrates a first network diagram of a risk scoring system 100 including a database, according to example embodiments. Referring to FIG. 1A, the system 100 includes a blockchain network, which may be either a public or a permissioned blockchain network.

The system 100 includes a blockchain client 104, which generates transaction proposals 136 to endorser nodes or peers 112 and a risk score module 116. The system 100 also includes various blockchain nodes or peers 108, shown as blockchain node or per 108A through blockchain node or peer 108Z, a smart contract 128, and a shared ledger 124.

In response to receiving the transaction proposals 136, the endorser nodes or peers 112 simulate the transaction proposals 136 and provide transaction data 168 to the risk score module 116. The transaction data 168 may include simulation results, an execution time of the transaction proposal, an issuer identifier for the transaction proposal, or a size of the transaction. For example, if there is a significant change in the size of a transaction, the risk score may increase. With respect to user identity, if a transaction previously was initialized by user A and suddenly the same transaction is initialized by user B, then it may be suspicious, and increase the risk score of the transaction. The risk score module 116 calculates a risk score and compares the risk score to a current risk score threshold 120. The risk score module 116 may be a container running along with a blockchain node or peer 108, or a separate routine running in a blockchain node or peer 108 which is different from a routine that executes the smart contract.

The risk score may be based upon the transaction data 168 and other data. The risk score module 116 may obtain the other data from various sources to compute a more meaningful or accurate risk score. Shared data 156 may be obtained from one or more blockchain nodes or peers 108. A history 144 of previous similar or identical transactions may be obtained from the shared ledger 124. An invocation history 140 or off-blockchain data access patterns 152 may be obtained from the smart contract 128. Smart contract 128 logic typically does not take into account past history of invocation of smart contracts or which other key/value pairs were written, updated, or read in the past.

In some embodiments, the smart contract 128 may obtain off-blockchain data 132 from a database or other external repository to the blockchain network. The off-blockchain data 132 may include, but is not required to include, very large data items that may include documents, photos, video, music, audio 148 etc. In some embodiments, storage for very large items on the blockchain may be limited, thus requiring off-blockchain data storage 132.

The risk score threshold 120 may be a network-wide, Hyperledger Fabric-channel-wide, or chaincode-wide parameter, depending on the implementation. In one embodiment, the risk score threshold 120 is fixed, while in other embodiments the risk score threshold 120 may vary based on received transaction data 168 and other data, as described herein. The risk score threshold 120 provides a value that designates a calculation boundary whereby transaction proposals 136 on one side of the boundary are recommended to be endorsed in an endorsement decision 160, and transaction proposals 136 on the other side of the boundary are recommended to be rejected in the endorsement decision 160. After calculating the risk score and making the endorsement decision 160, the risk score module 116 provides the endorsement decision 160 to the endorser nodes or peers.

The endorser nodes or peers 112 receive the endorsement decisions 160, and provides endorsements or rejections 164 to the blockchain client 104 based on the endorsement decisions 160. In one embodiment, if the endorsement decision 160 suggests rejection of a transaction proposal 136, then a rejection 164 is provided to the blockchain client 104. In another embodiment, if the endorsement decision 160 suggests endorsement of a transaction proposal 136, then an endorsement 164 is provided to the blockchain client 104. In one embodiment, an endorsement decision 160 may be reviewed prior to the transaction proposal 136 simulation. In another embodiment, a transaction proposal 136 may not be simulated if a corresponding endorsement decision 160 recommends rejection, and a rejection 164 may be provided to the blockchain client 104. In another embodiment, the endorsement decision 160 may be reviewed following the transaction proposal 136 simulation.

Figure 1B:
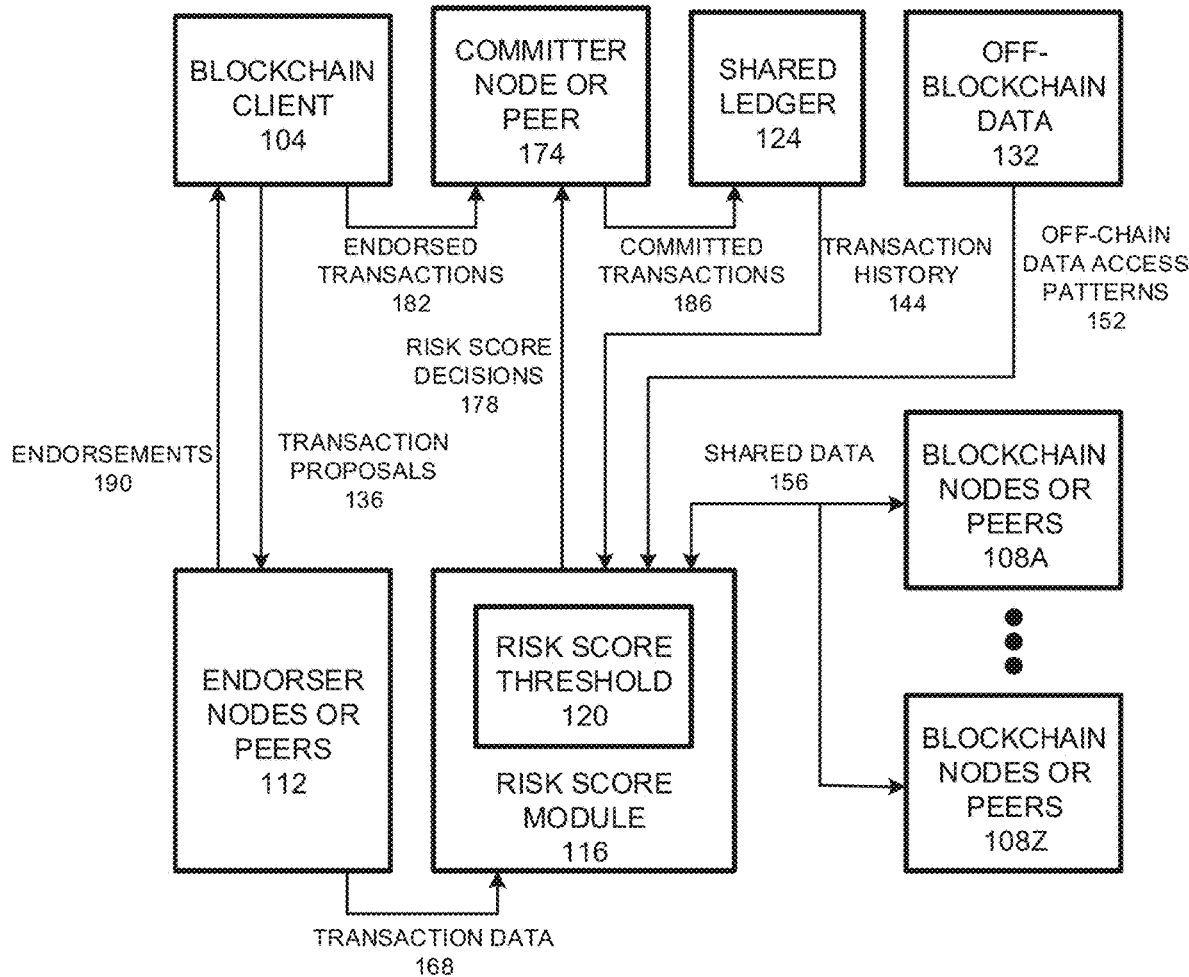
FIG. 1B illustrates a second network diagram of a risk scoring system including a database, according to example embodiments.

FIG. 1B illustrates a second network diagram of a risk scoring system including a database according to example embodiments. Referring to FIG. 1B, the system 170 includes a blockchain network, which may be either a public or a permissioned blockchain network.

The system 170 may be similar to system 100 described in FIG. 1A, but operates at the commitment phase rather than the endorsement phase. The system 170 includes the blockchain client 104, which generates transaction proposals 136 to the endorser nodes or peers 112. The system 170 may also includes a risk score module 116, a committer node or peer 174, blockchain nodes or peers 108, shown as blockchain node or peer 108A through blockchain node or peer 108Z, off-blockchain data 132, and a shared ledger 124.

In response to receiving the transaction proposals 136, the endorser nodes or peers 112 simulate the transaction proposals 136 and provide transaction data 168 to the risk score module 116. After simulating the transaction proposals 136, the endorser nodes or peers 112 provide endorsements 190 to the blockchain client 104. The risk score module 116 calculates a risk score and provides risk score decisions 178 to the committer node or peer 174, based on the calculated risk score that is compared to the current risk score threshold 120. The risk score threshold 120 provides a value that designates a calculation boundary whereby transaction proposals 136 on one side of the boundary are recommended to be committed in a risk score decision 178, and transaction proposals 136 on the other side of the boundary are recommended to be rejected in the risk score decision 178. In one embodiment, the risk score threshold 120 is fixed, while in other embodiments the risk score threshold 120 may vary based on received transaction proposals 136 and other data, as described herein. The transaction data 168 may include an identity of a user or initiating blockchain client 104 that generates the transaction proposals 136 as well as an indication of the size or amount of data affected by the transaction proposals 136.

The risk score module 116 may obtain other data from various sources to compute a more meaningful or accurate risk score. Shared data 156 may be obtained from the one or more blockchain nodes or peers 108. A history 144 of previous similar or identical transactions may be obtained from the shared ledger 124. Off-blockchain data access patterns 152 may be obtained from the off-blockchain data 132. The off-blockchain data 132 may include, but is not required to include, very large data items that may include documents, photos, video, music, audio etc. In some embodiments, storage for very large items on the blockchain may be limited, thus requiring off-blockchain data storage 132.

The committer node or peer 174 receive the risk score decisions 178 from the risk score module 116 and endorsed transactions 182 from the blockchain client 104. In one embodiment, if the risk score decision 178 suggests rejection of an endorsed transaction 182, then the corresponding transaction will not be committed to the shared ledger 124. In another embodiment, if the risk score decision 178 suggests approval of an endorsed transaction 182, then the corresponding transaction will be committed 186 to the shared ledger 124.

Figure 2A:
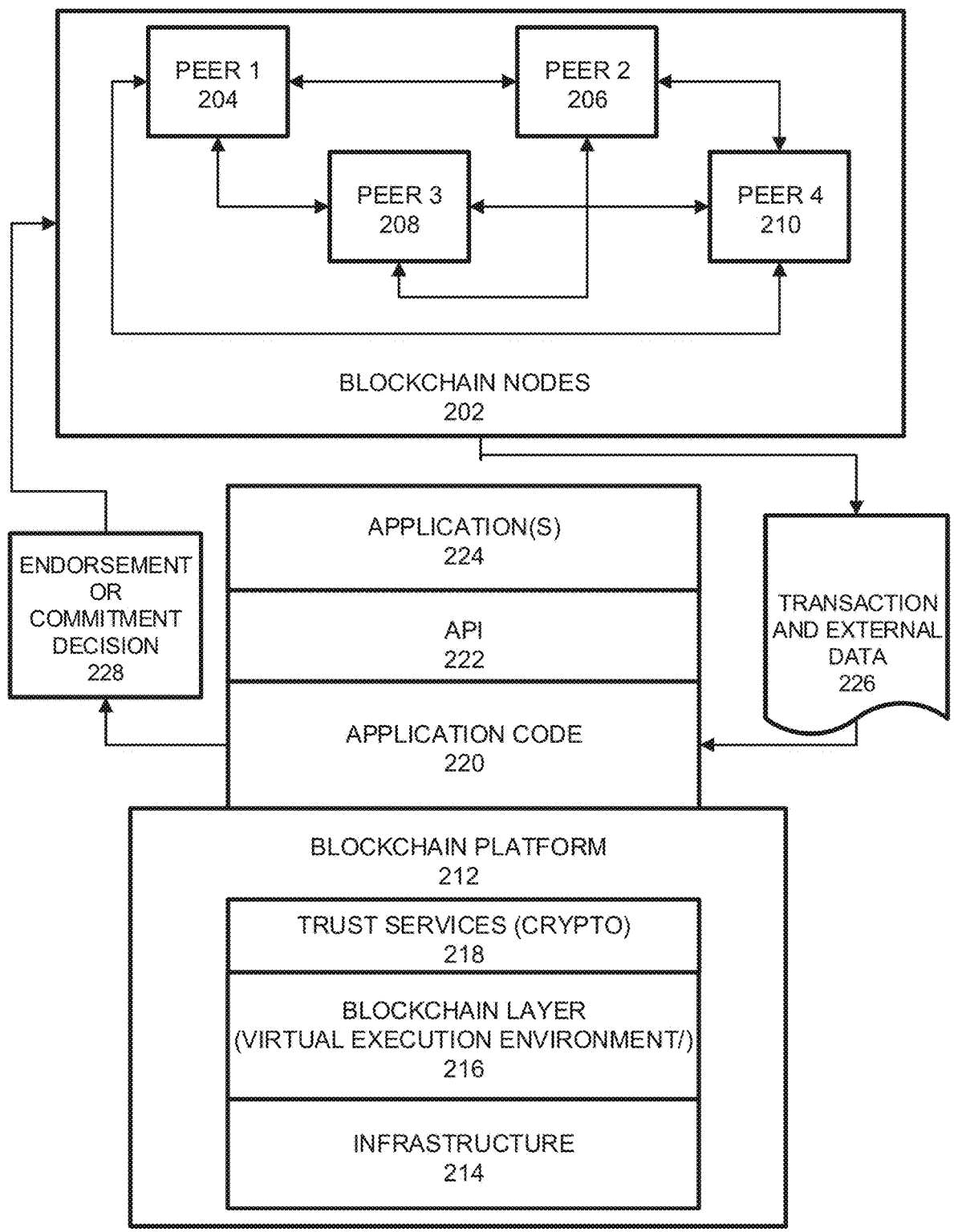
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include transaction and external data, and may be processed by one or more processing entities (e.g., virtual machines) included in the blockchain layer 216. The result 228 may include an endorsement or commitment decision. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
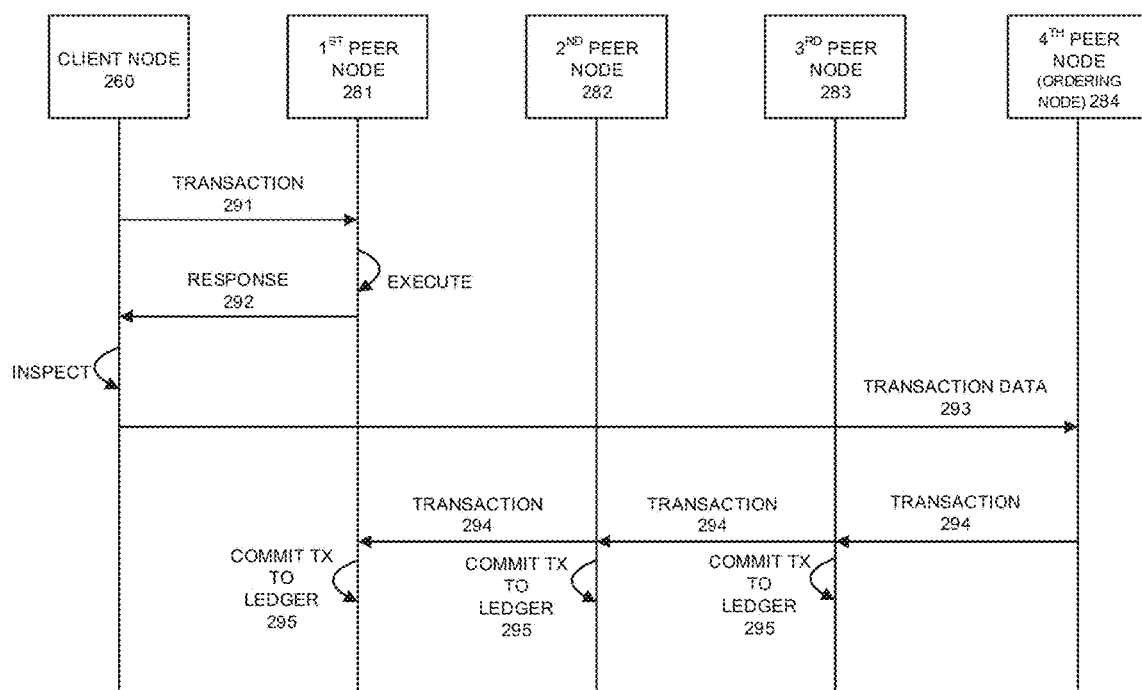
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
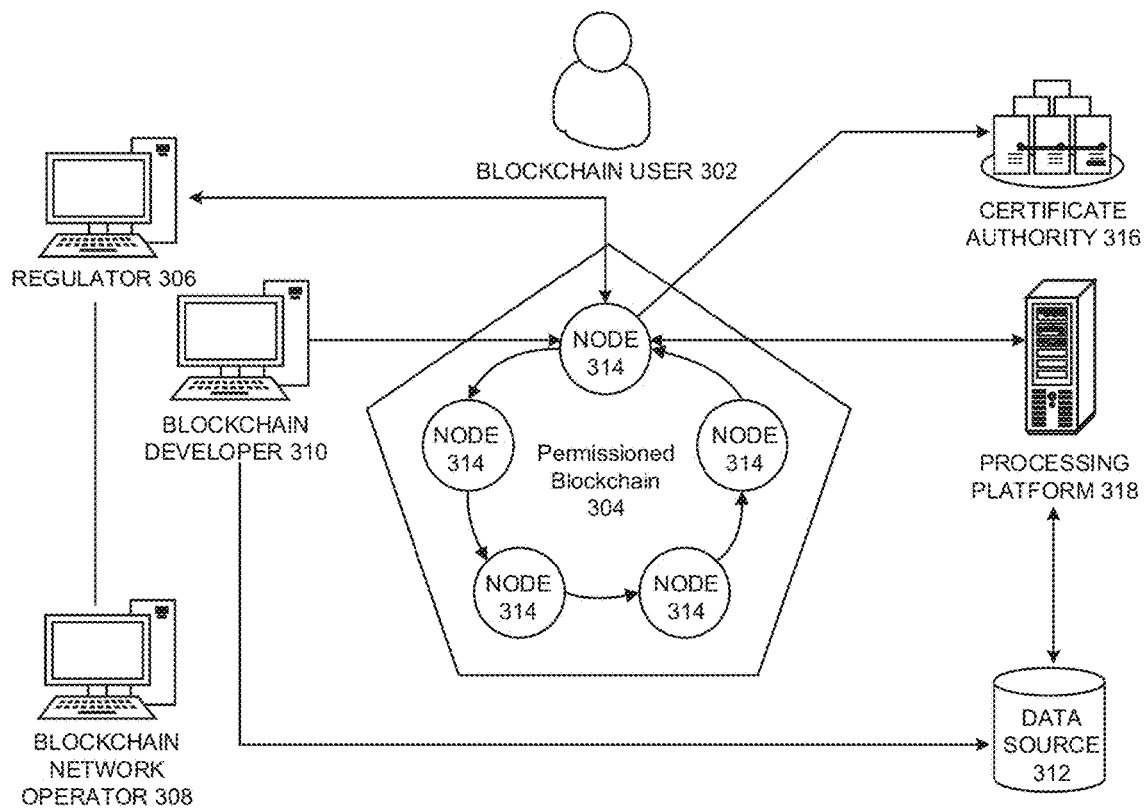
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
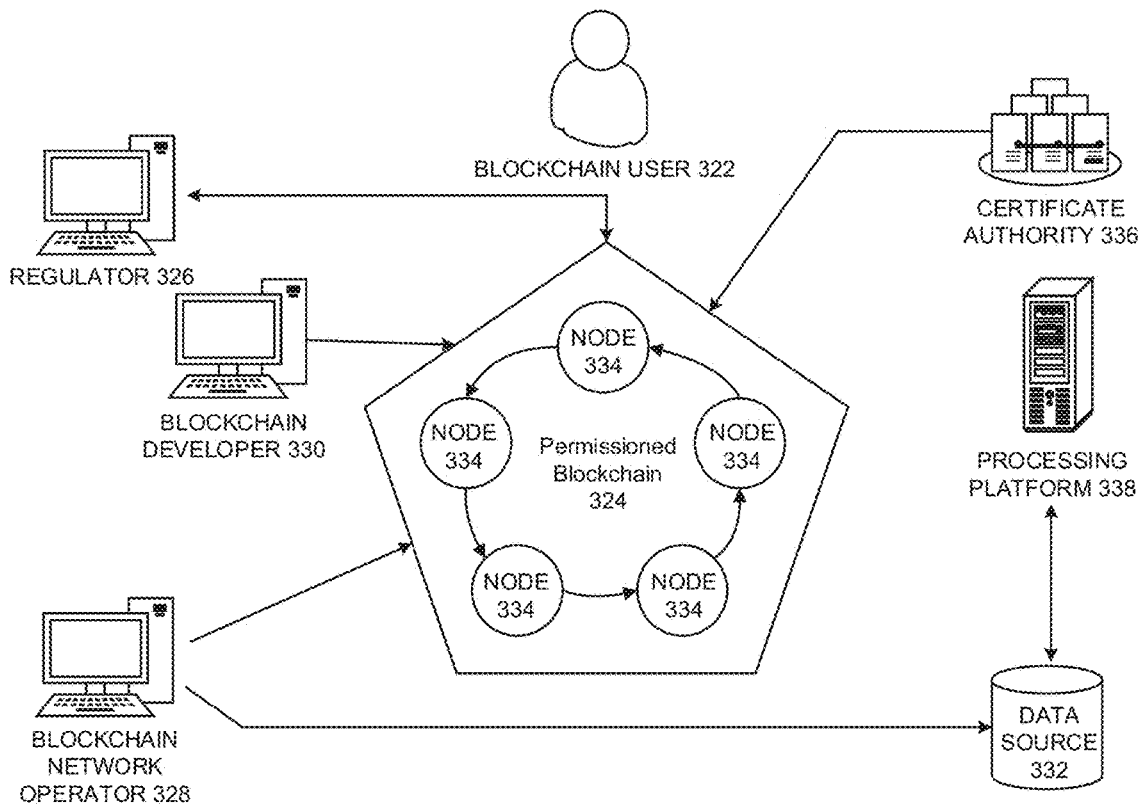
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
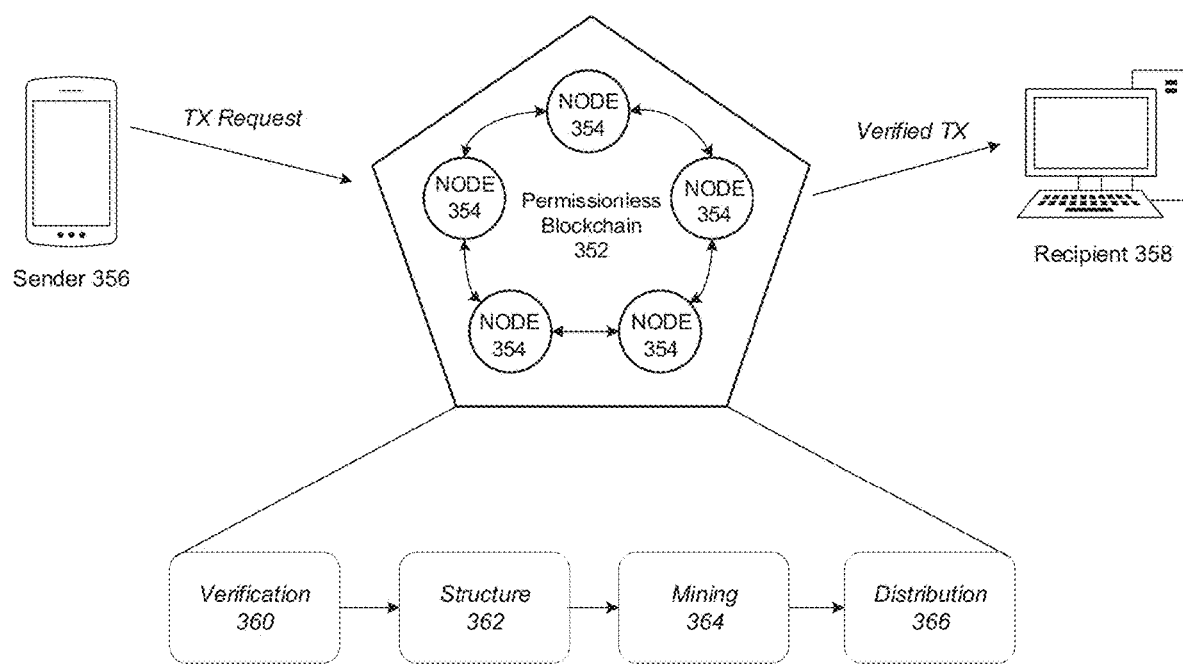
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4:
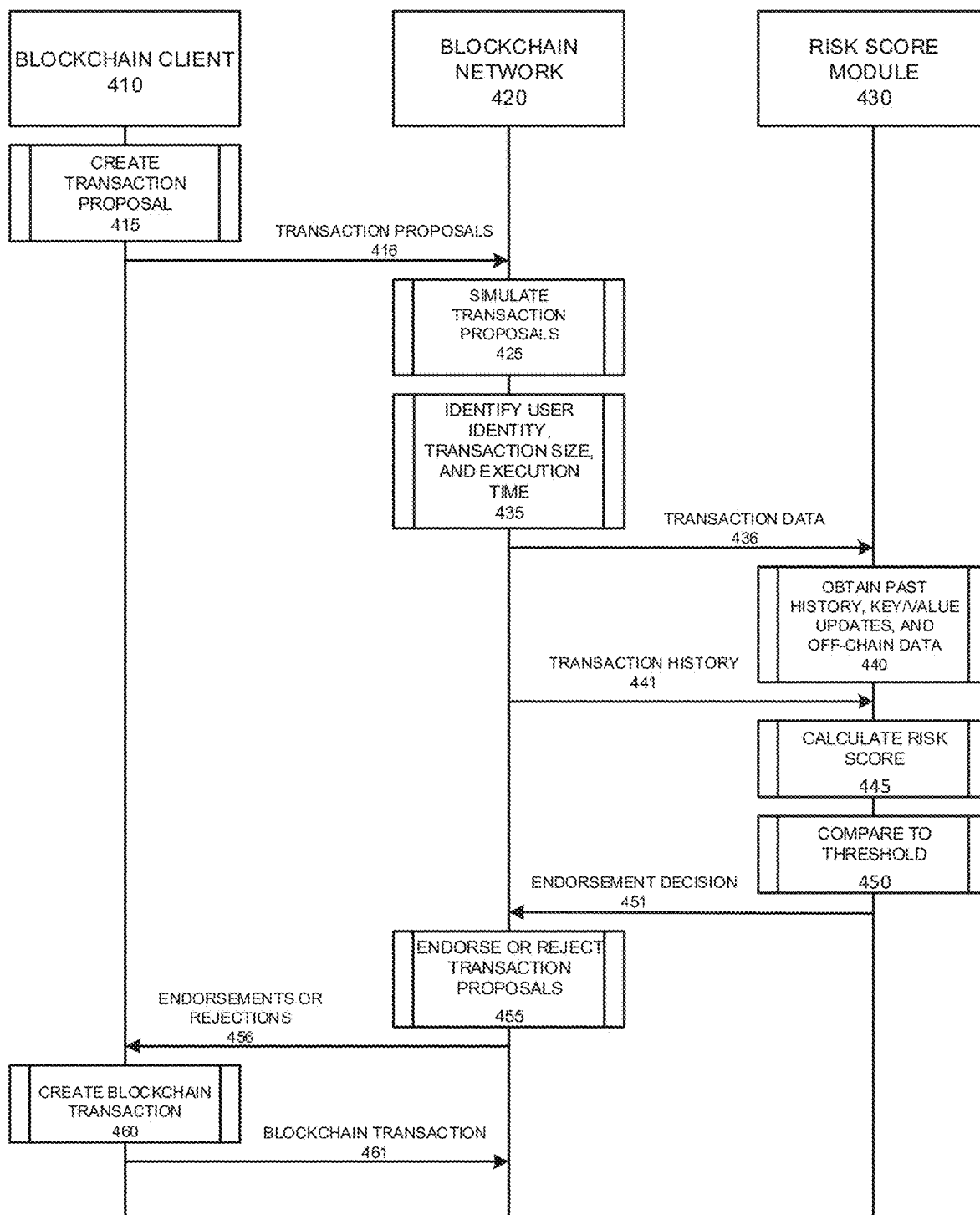
FIG. 4 illustrates a system messaging diagram for performing risk-based transaction endorsement, according to example embodiments.

FIG. 4 illustrates a system messaging diagram 400 for performing risk-based transaction endorsement, according to example embodiments. Referring to FIG. 4, the system diagram 400 includes a blockchain client 410, a blockchain network 420, and a risk score module 430. The blockchain client 410 generates a transaction proposal 415 to the blockchain network 420. The transaction proposals 416 are transferred to endorser nodes or peers of the blockchain network 420, which simulate the transaction proposals 425. The endorser nodes or peers of the blockchain network 420 may identify a user identity, a transaction size, and an execution time 435 from the transaction proposals 416, and provides this information as transaction data 436 to the risk score module 430.

In response to receiving the transaction data 436, the risk score module 430 may obtain past history, key/value updates related to previous similar or identical transactions as the received transaction proposals, and off-chain data 440. Transaction history 441 may be retrieved from a shared ledger of the blockchain network 420. If a transaction previously updated a specific range of key/value pairs, but suddenly begins to update other key/value pairs, then the transaction may be suspicious and the corresponding risk score may increase.

In addition to historical 441 and transaction data 436, the risk score module 430 may obtain off-chain data from storage resources that are not part of the blockchain network 420. The off-chain data may include forms of data not suitable to store in the blockchain network 420.

The risk score module 430 calculates a risk score 445 for the transaction proposal 416, and compares the calculated risk score to a risk threshold 450. The risk threshold identifies a current level that delineates normal transactions from anomalous blockchain transactions. From the compared risk score, the risk score module 430 determines an endorsement decision 451, and provides the endorsement decision 451 to endorser nodes or peers of the blockchain network 420. The endorsement decision 451 may either recommend endorsement or rejection 455 of a corresponding transaction proposal 416.

The endorser nodes or peers of the blockchain network 420 may simulate the transaction proposals 425 either before or after receiving the endorsement decision 451. In one embodiment, if a received endorsement decision 451 recommends endorsement, the endorser nodes or peers may return an endorsement 456 to the blockchain node or peer 410. In another embodiment, if a received endorsement decision 451 recommends rejection, the endorser nodes or peers may return a rejection 456 to the blockchain node or peer 410. In response to receiving endorsements 456, the blockchain client 410 creates a blockchain transaction 460 and provides the blockchain transaction 461 to the blockchain network 420.

Figure 5A:
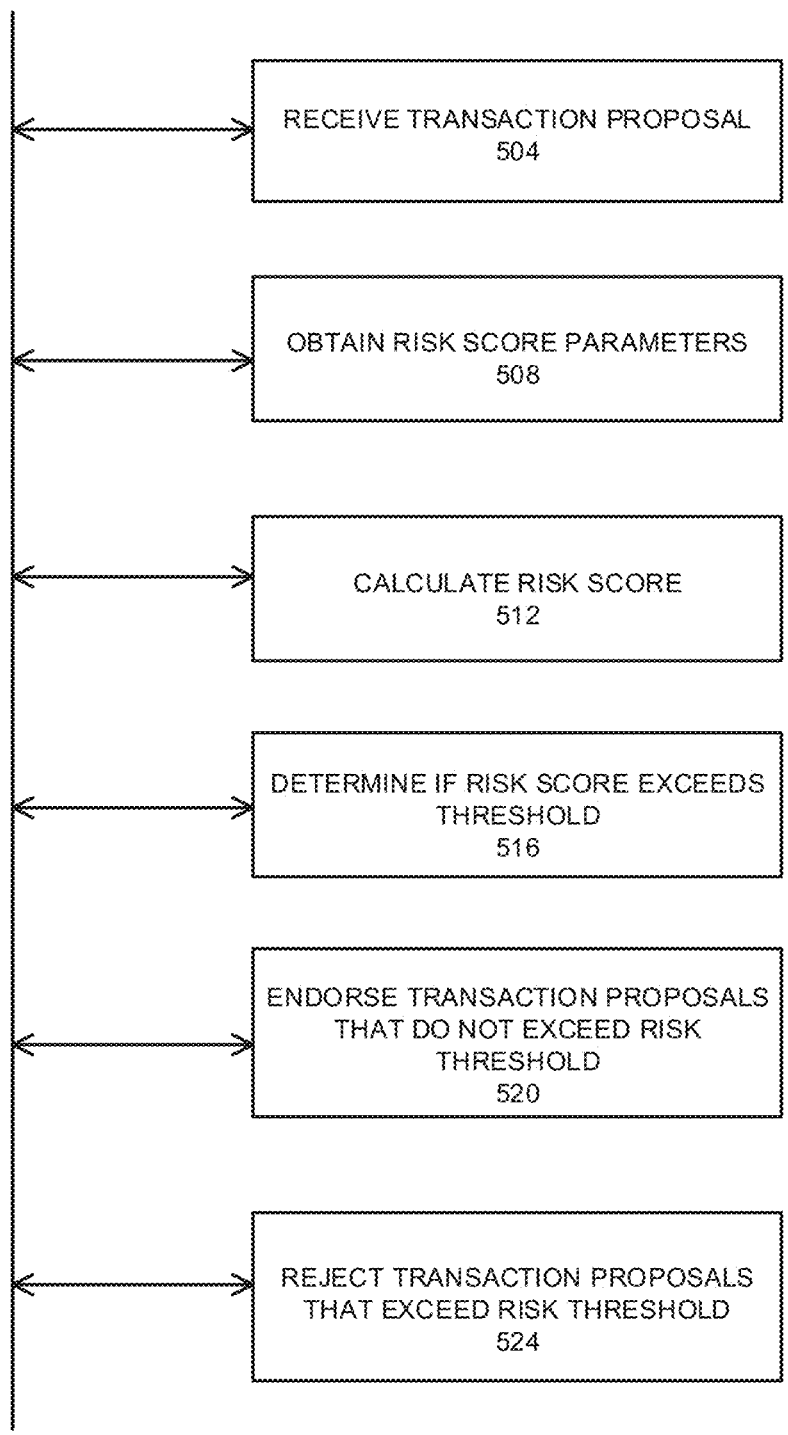
FIG. 5A illustrates a flow diagram of an example method of endorsements based on risk scores, according to example embodiments.

FIG. 5A illustrates a flow diagram of an example method 500 of endorsements based on risk scores, according to example embodiments. Referring to FIG. 5A, the method 500 may include one or more of the following steps.

At block 504, a blockchain endorser node or peer receives a transaction proposal. The disclosed methods compute a risk score for new transactions, including invoke and query transactions.

At block 508, a risk score module obtains risk score parameters. Risk score parameters may be obtained from the endorser node or peer that received the transaction proposal. The risk score module may also be invoked before a transaction is committed to the shared ledger. The risk score may be a threshold-based number.

The risk score module has several relevant inputs that may be used to calculate a risk score: an identity of a user initiating a transaction, a size of a transaction, past history from this identified user, past updates to a particular key/value pair, and an execution time. The input information may be related to on-chain transactions, such as an actual invoice of a financial transaction on the blockchain.

The risk score module may also accept off-chain data as inputs, and may combine on-chain data and off-chain data. The off-chain data may include large items such as photos, music, and documents. The off-chain data may be accessed by smart contracts on the blockchain. The access pattern of the off-chain data store may be monitored in order to identify the anomalous on-chain application/smart contract. A smart contract may read off-chain data, then suddenly intensively write to the off-chain data. A smart contract may attempt to access off-chain data that it has never accessed before. An application may typically access the off-chain data periodically that has not been connected to the off-chain data for a period of time.

The risk score computation may also be organization-specific. Different peers may share information from various applications/smart contracts/off-chain data in order to achieve more optimal or accurate risk score estimation.

At block 512, the risk score module calculates a risk score for the transaction proposal. The risk score may be computed by taking into account both smart contract and application semantics, and off-chain data. For example, if an application utilizes a sensor collecting temperature data, the value of the data it creates should not be larger than 150 F, otherwise it may indicate an anomaly or malicious transaction.

At block 516, the risk score module determines if the calculated risk score exceeds a threshold. In one embodiment, the threshold is predetermined and fixed. In another embodiment, the threshold may be variable and changes in response to previously calculated risk scores or obtained risk parameters.

At block 520, an endorser node or peer endorses the transaction proposal in response to the transaction proposal does not exceed the risk threshold.

At block 524, the endorser node or peer rejects the transaction proposal in response to the transaction proposal exceeds the risk threshold.

Figure 5B:
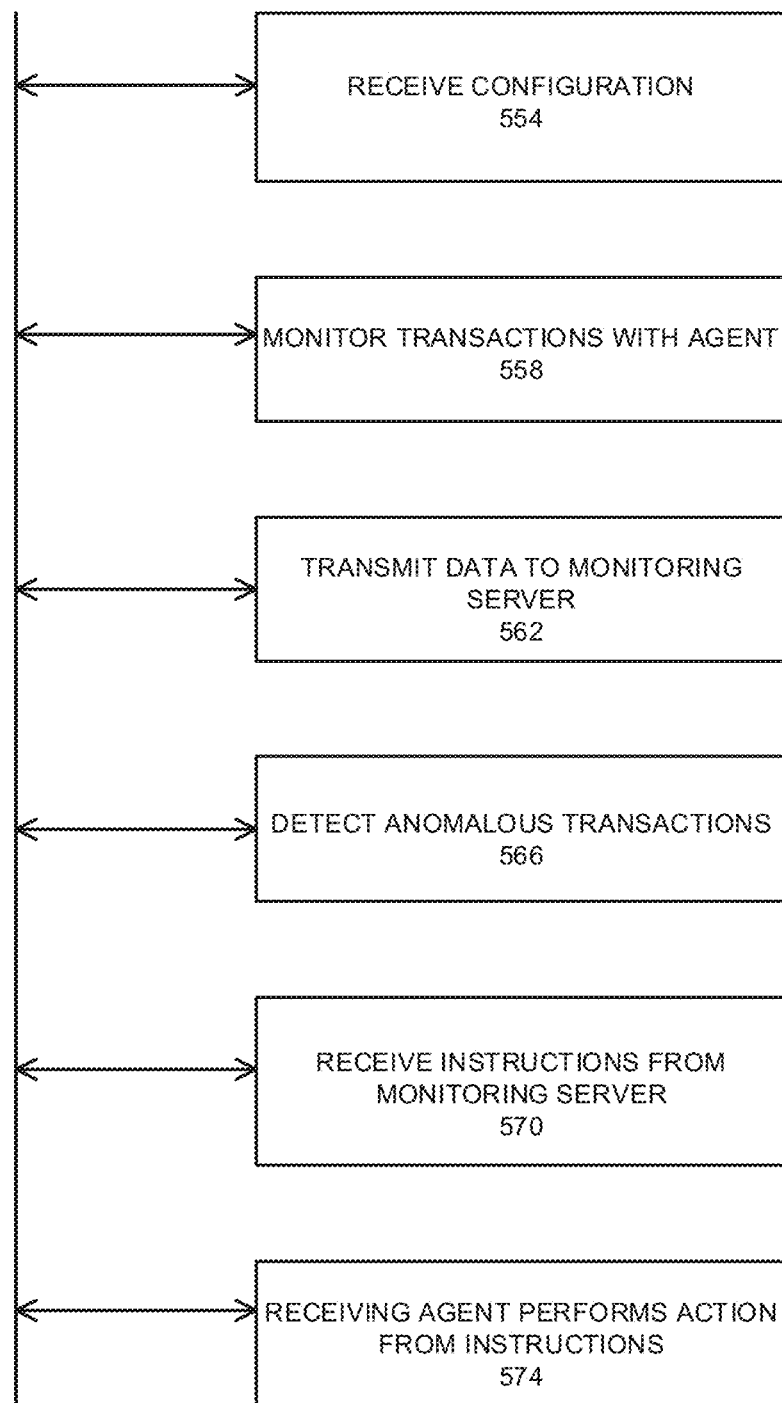
FIG. 5B illustrates a flow diagram of an example method of detecting anomalous transactions, according to example embodiments.

FIG. 5B illustrates a flow diagram 550 of an example method of detecting anomalous transactions, according to example embodiments. Referring to FIG. 5B, the method 550 may include one or more of the following steps.

At block 554, a configuration is received for an agent associated with an application to monitor application transactions. In some embodiments, the configuration can be received following either a push or pull operation. In some embodiments, the configuration of the agent can be dynamically updated during application/agent runtime. In some embodiments, the agent can be dynamically replaced or supplemented with a different agent with differing capabilities during runtime. In some embodiments, agent configurations can include, among other things, instructions as to what type of transactions to monitor, monitoring frequency, monitoring rules, default actions, alert parameters, error procedures, communication details (e.g., security, which other agents/components to communicate with, etc.), and the like. As will be appreciated by those of ordinary skill in the art, agent configurations can include many other configuration options consistent with this disclosure. The provided examples are not meant to limit possible agent configurations in any way.

At block 558, incoming and outgoing application transactions are monitored using the agent. In typical embodiments, agent code is inserted and compiled into the application code as part of the application so that the agent "sees" transactions from the point of view of the application and not from a removed position. In some embodiments, the transactions are performed using the secure shell (SSH) protocol.

At block 562, monitored transaction data is transmitted to a monitoring server for anomalous transaction detection.

At block 566, a determination is made whether anomalous transactions have been detected. In some embodiments, the anomalous transaction detection is performed using a learning machine using behavior models continuously updated by learning machine determinations. If an anomalous transaction has not been detected, the method proceeds back to block 558 to continue monitoring of incoming and outgoing application transactions. If an anomalous transaction has been detected, the method proceeds to block 570.

At block 570, instructions from the monitoring server are received to perform an action based on the transmitted monitored transaction data. Actions can include, among others, rerouting transactions, blocking transactions, etc.

At block 574, the receiving system/agent performs an action based on the received instructions. In some embodiments, actions can include those performed by the agent as well as triggering other agents/systems to perform actions. In some embodiments, the system/agent reports a status of the performed action to the monitoring server to ensure the actions have been completed. If necessary, the monitoring server can request further actions or trigger other systems/agents to perform actions.

Figure 6A:
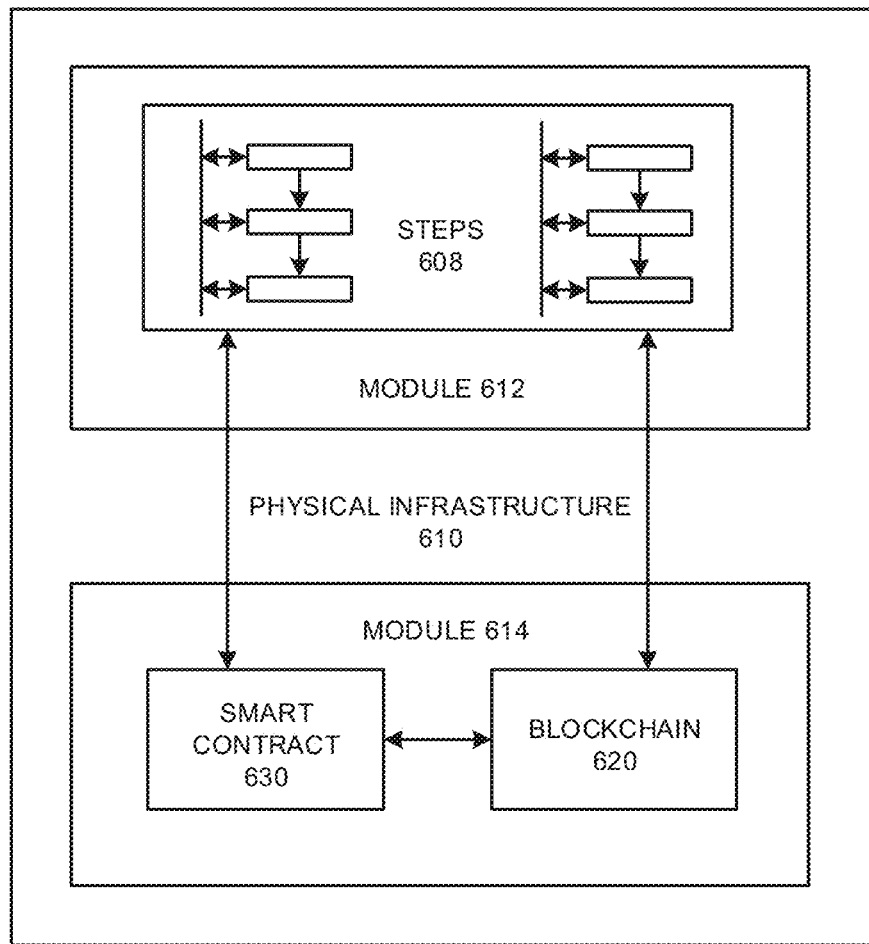
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
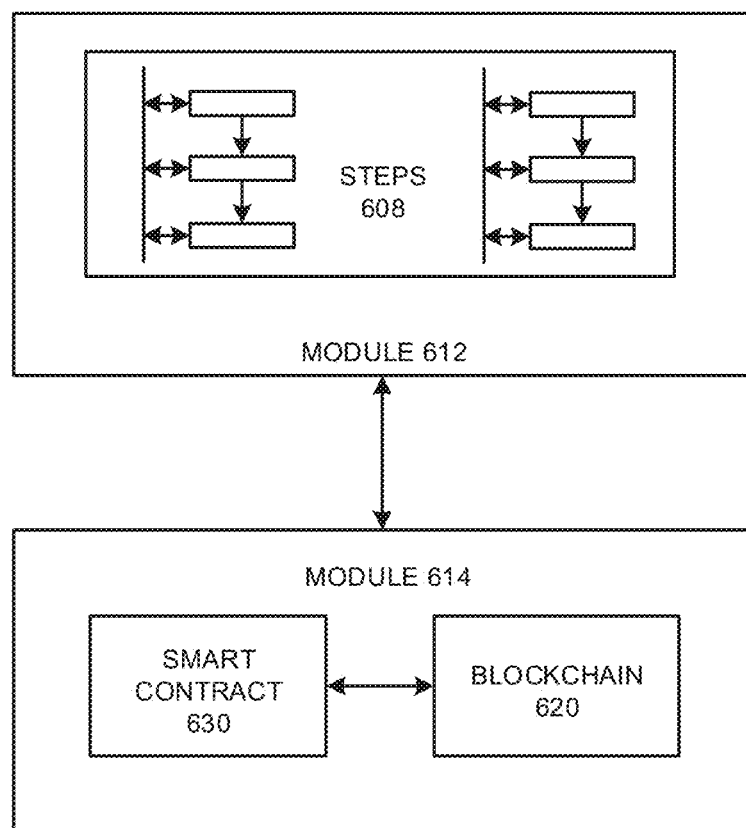
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
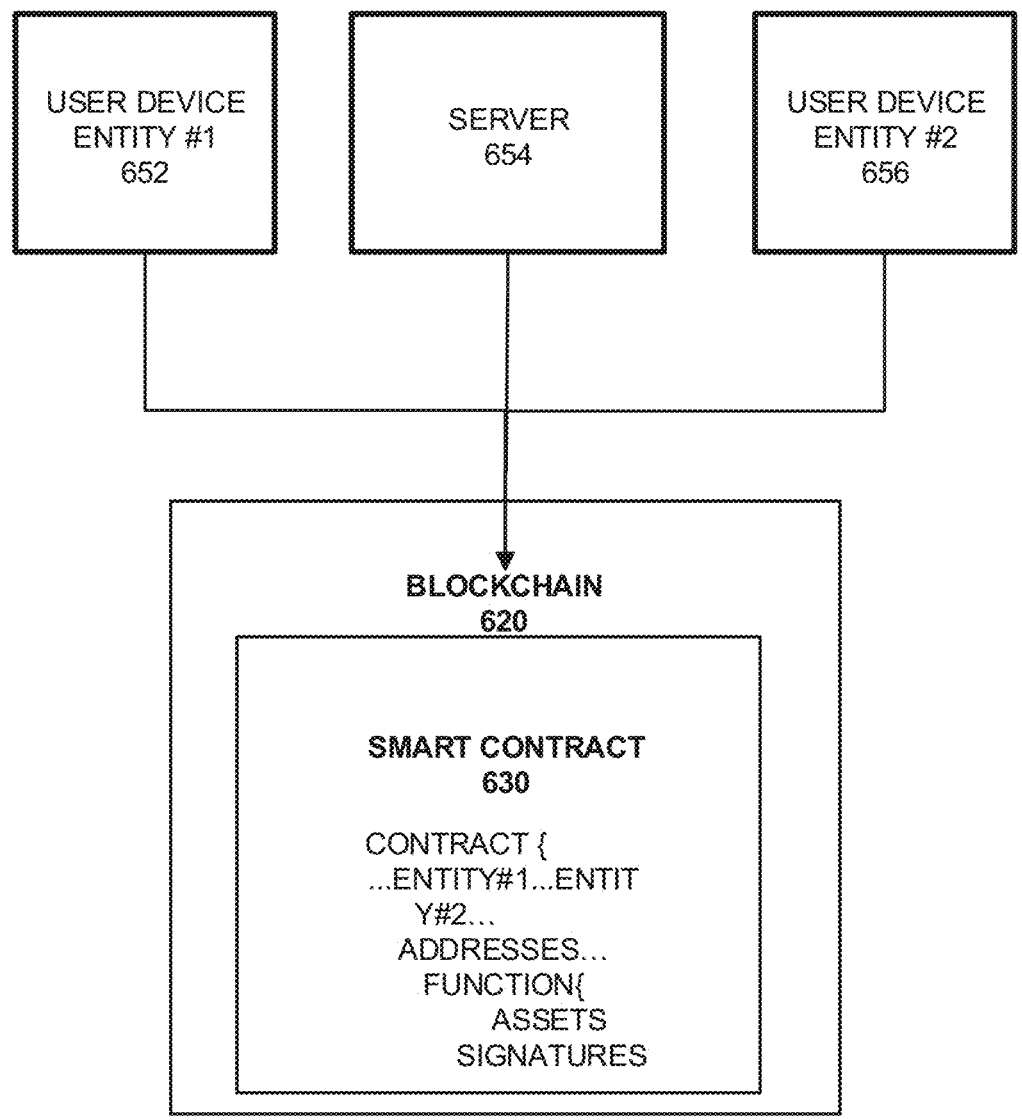
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
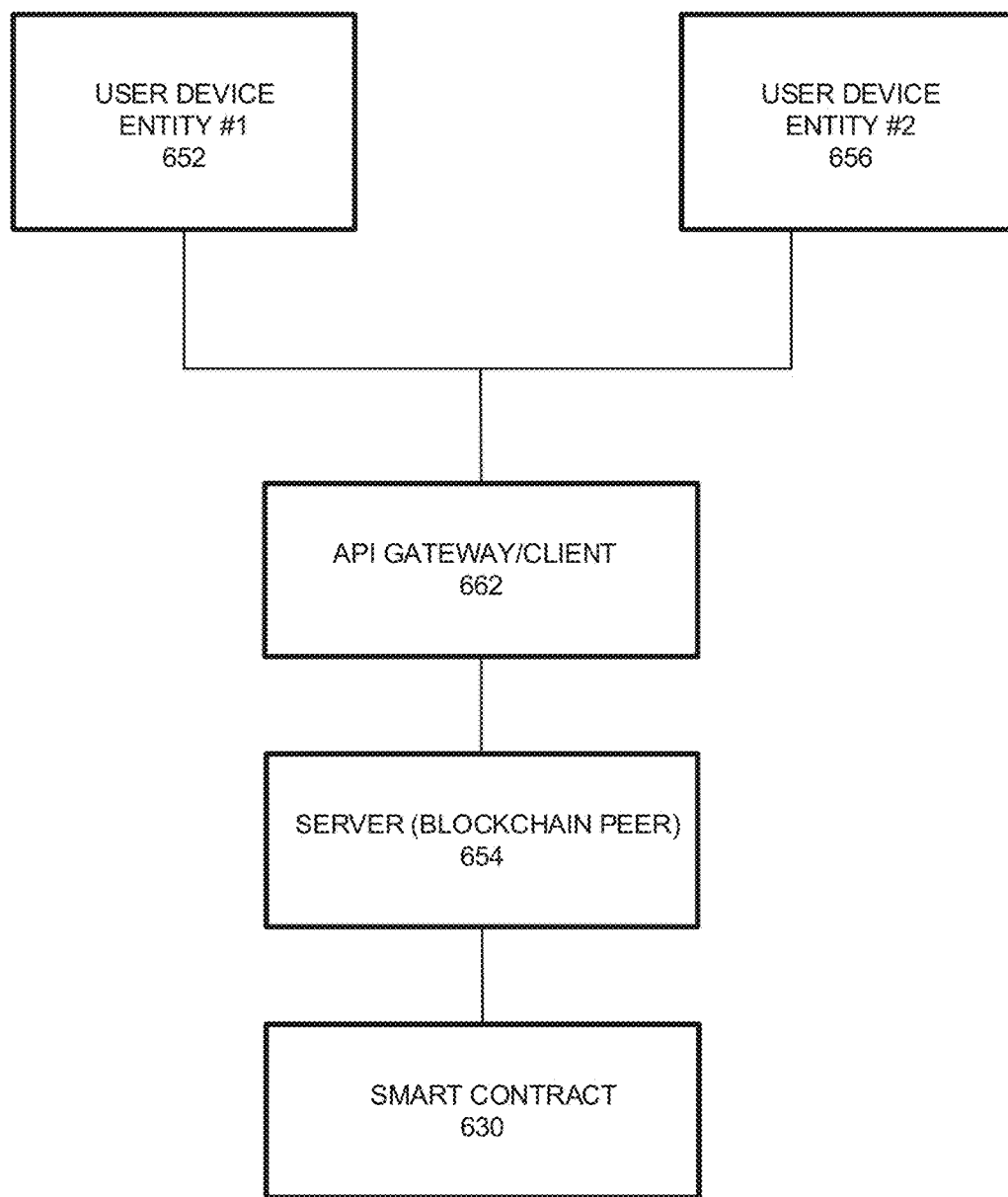
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
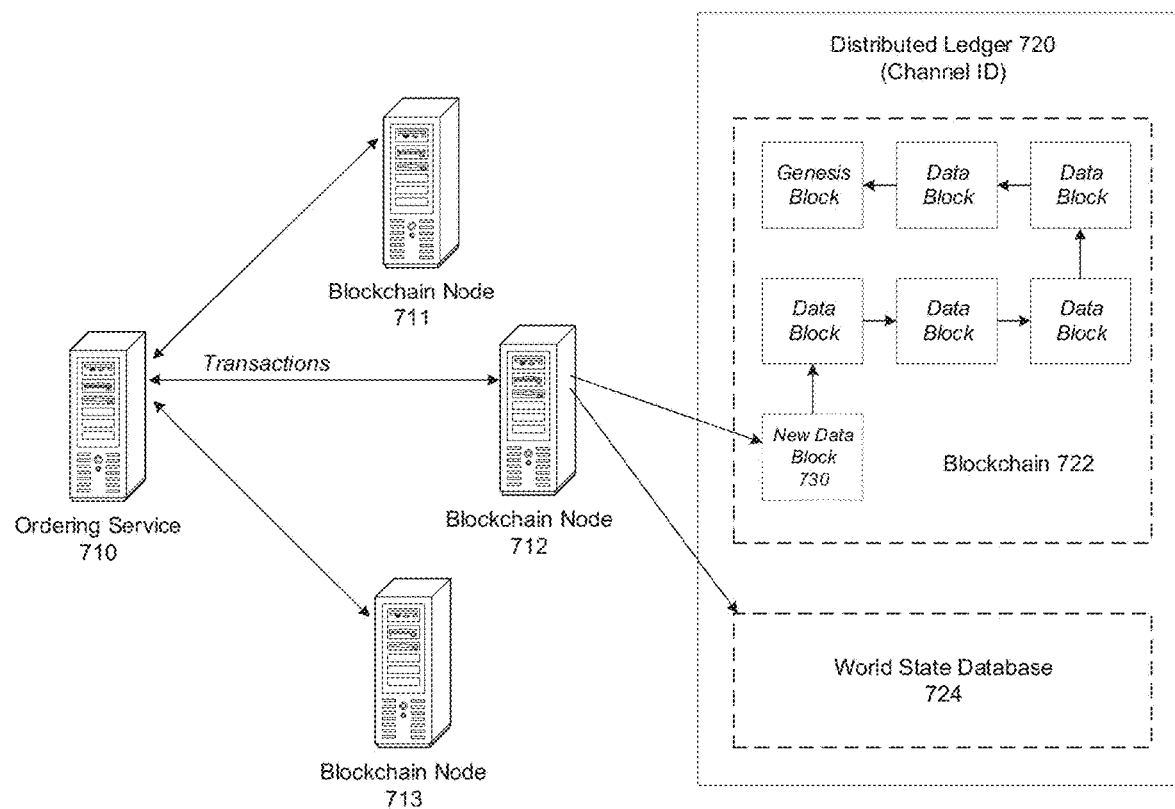
FIG. 7A illustrates a process for a new block being added to a distributed ledger, according to example embodiments.
Figure 7B:
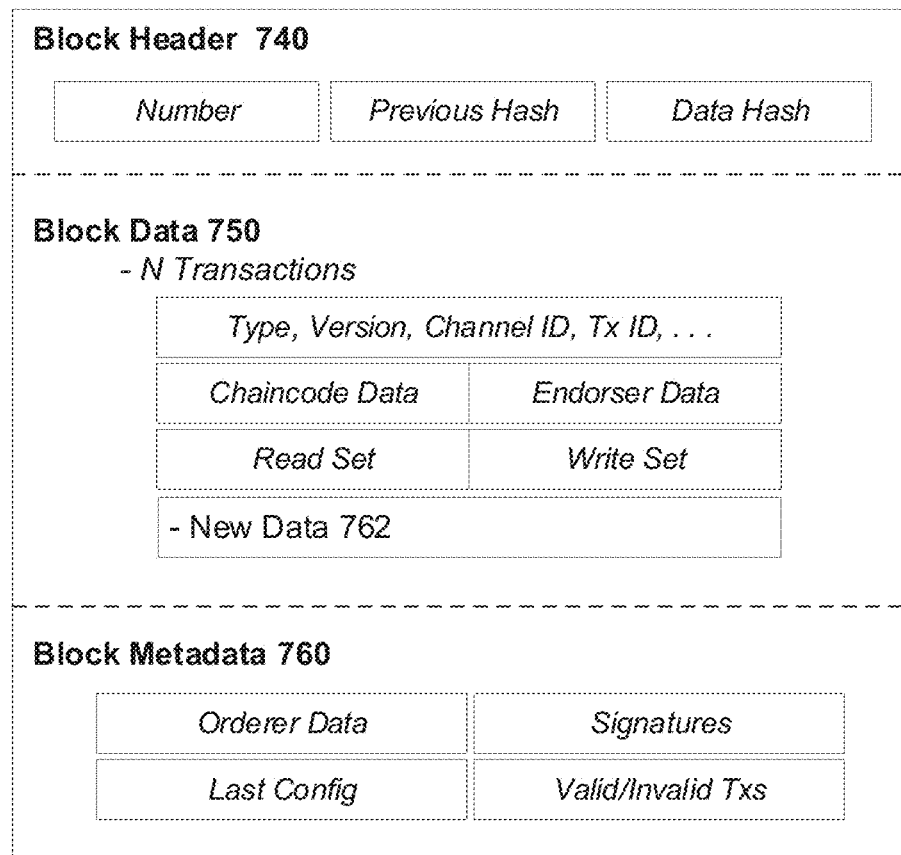
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
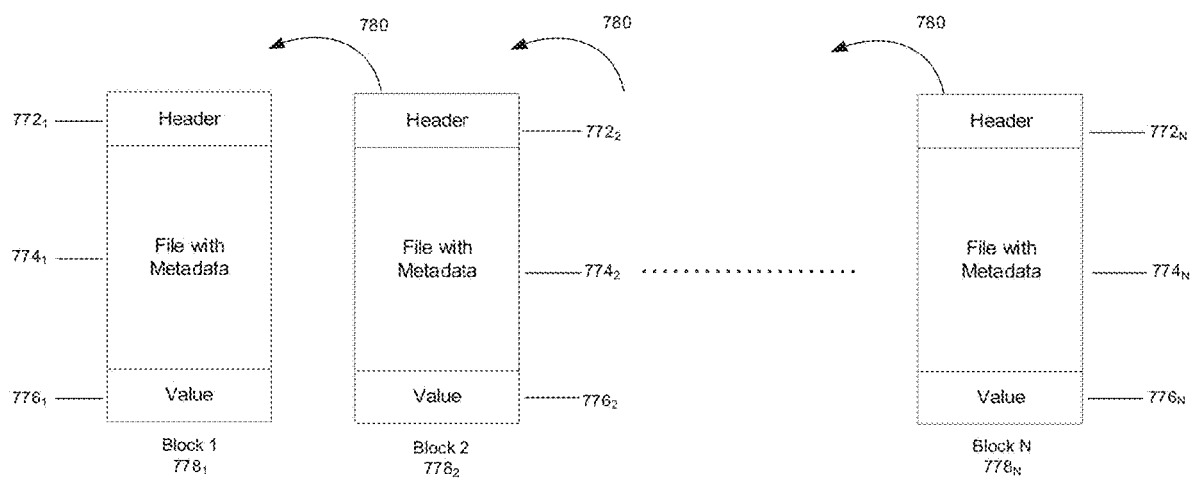
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| Block N Hash Value | Block N Hash Value ... Content |

In the example embodiment of FIG. 7C, the blockchain 770 includes a number of blocks $778_1$, $778_2$, ... $778_N$ cryptographically linked in an ordered sequence, where $N \geq 1$. The encryption used to link the blocks $778_1$, $778_2$, ... $778_N$ may be any of a number of keyed or un-keyed Hash functions. In one embodiment, the blocks $778_1$, $778_2$, ... $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1$, $778_2$, ..., $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
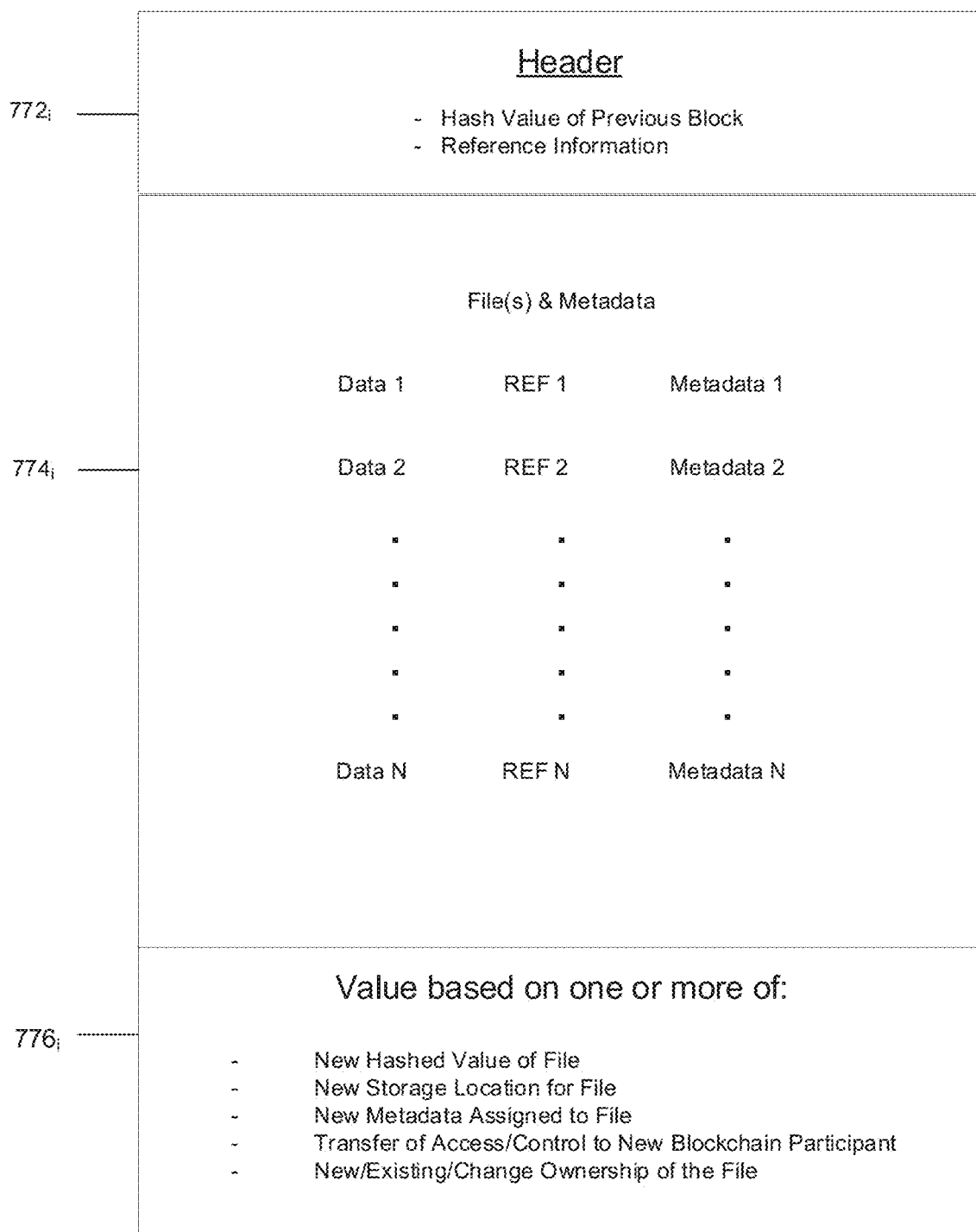
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
    b) new storage location for the file
    c) new metadata identified associated with the file
    d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_1$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
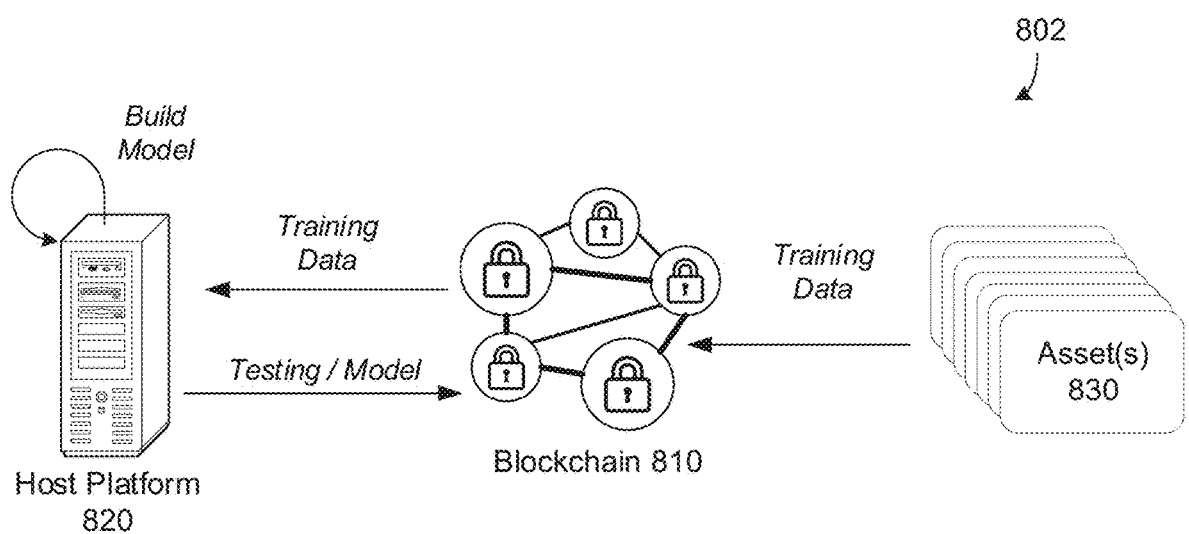
FIG. 8A illustrates an example blockchain which stores machine learning (artificial intelligence) data, according to example embodiments.
Figure 8A:
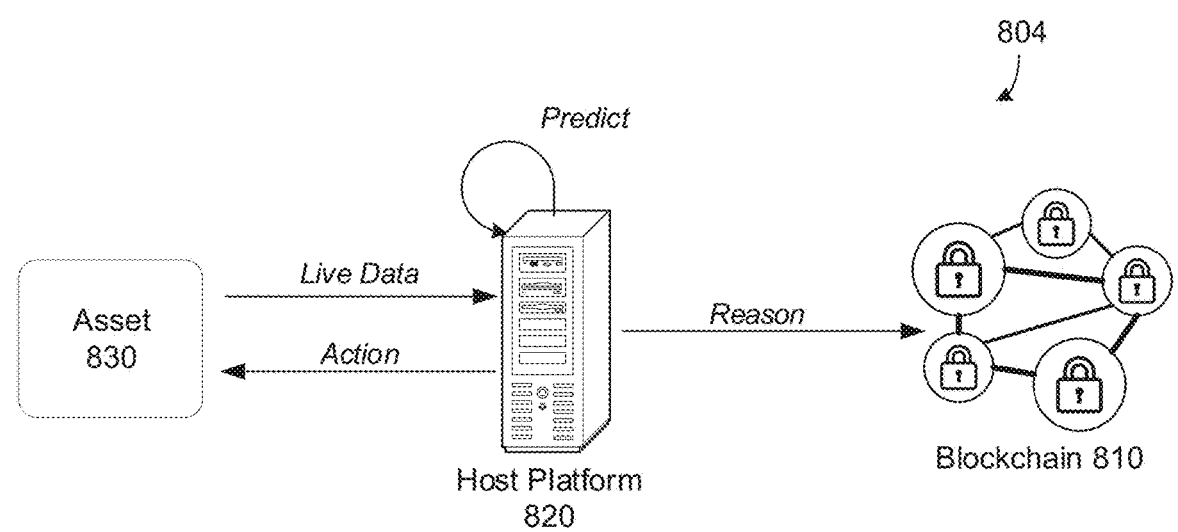
Figure 8B:
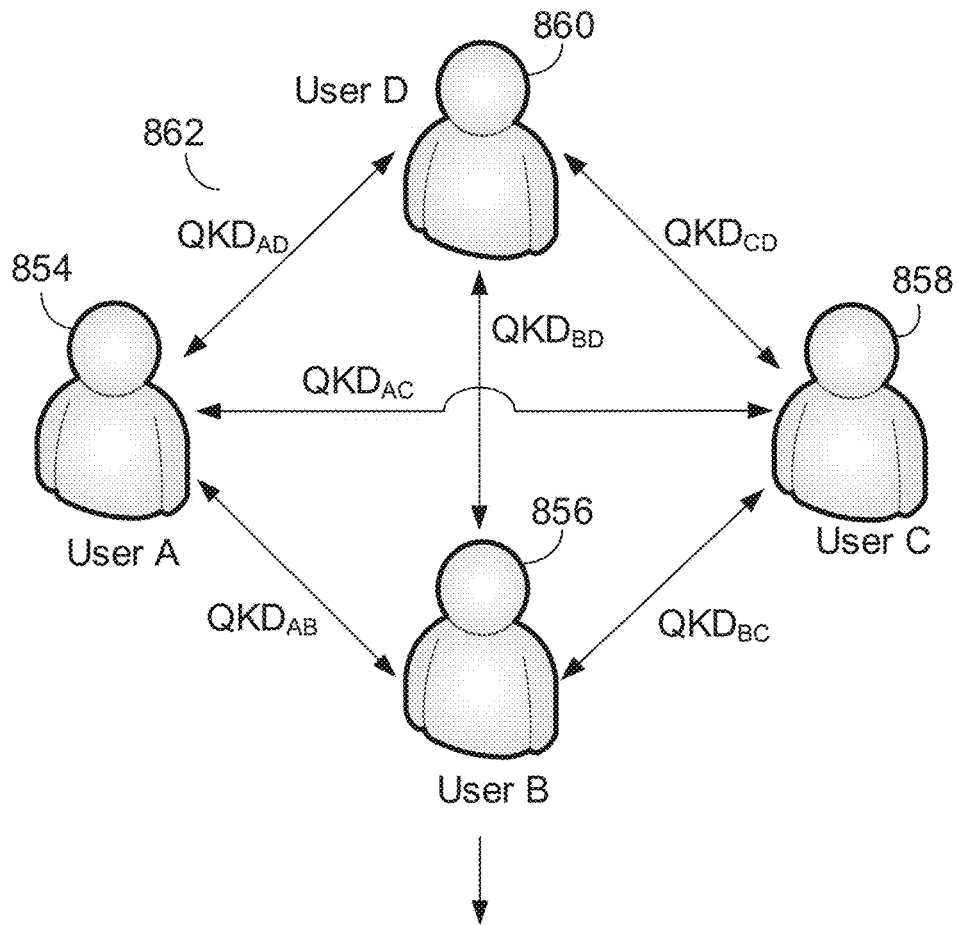
FIG. 8B illustrates an example quantum-secure blockchain, according to example embodiments.
Figure 8B:
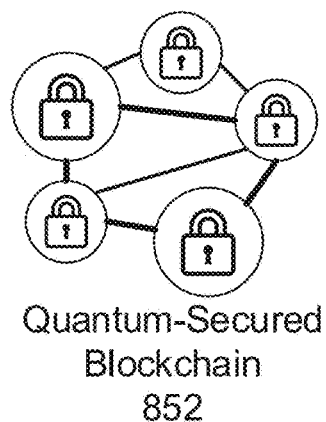

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000 s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
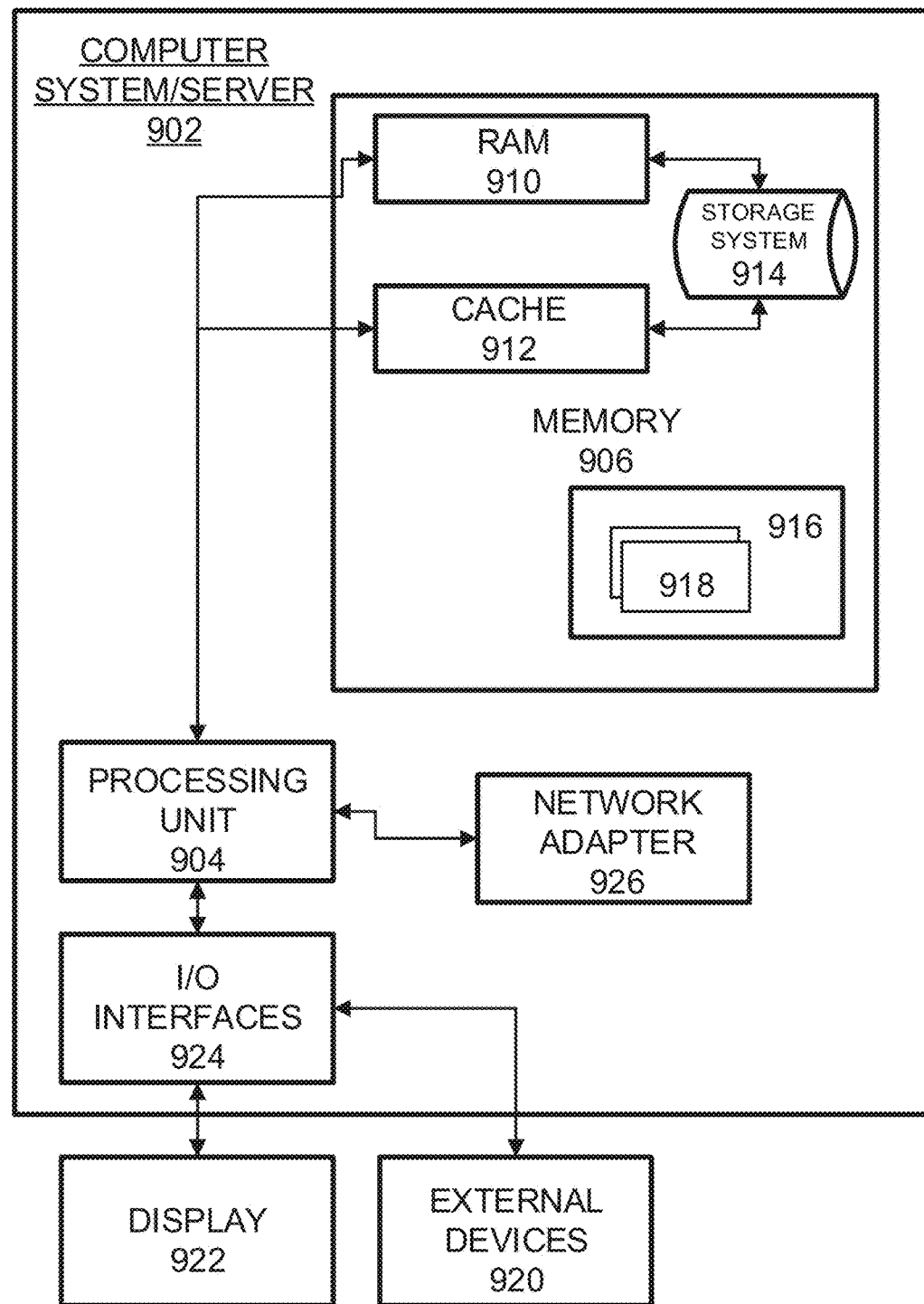
FIG. 9 illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
    a processor configured to:
        insert agent code into a software application and compile the agent code with the application code to integrate an agent into the software application with monitoring rules for monitoring blockchain transaction submissions from the software application to a smart contract on a blockchain ledger of a blockchain network based on the monitoring rules,
        receive, from the agent, a blockchain transaction submitted by the software application to the smart contract during a monitoring by the agent,
        obtain external data from a repository external to the blockchain network,
        identify, based on the external data, that a pattern of accessing an external data store by the smart contract is anomalous,
        generate a decision to block the received blockchain transaction from being stored on the blockchain ledger based on the identified anomalous pattern, and
        transmit a notice of rejection of the blockchain transaction to a client application that submitted the blockchain transaction.

2. The system of claim 1, further comprising:
    an endorser node of the blockchain network configured to:
    simulate the blockchain transaction.

3. The system of claim 2, wherein the blockchain transaction comprises one or more of:
    an identity of an originator of the blockchain transaction,
    an indication of an amount of data affected by the blockchain transaction, and
    an indication of whether risk scoring is to be applied to the blockchain transaction.

4. The system of claim 1, wherein the processor is further configured to:
    obtain a transaction history for previous transactions, and
    obtain shared data from one or more other nodes of the blockchain network.

5. The system of claim 4, wherein the transaction history comprises one or more of:
    information identifying when a same blockchain transaction was previously invoked,
    information identifying a frequency at which the same blockchain transaction was previously invoked,
    information identifying one or more key-value pairs or a range of key-value pairs updated when the same blockchain transaction was previously invoked, and information identifying a length of time the same blockchain transaction ran during the previous invocation.

6. The system of claim 4, wherein the processor is further configured to:
    identify that a blockchain transaction proposal is for a transaction that is the same as a previous transaction,
    identify key/value pairs associated with the previous transaction, and
    identify the transaction proposal as suspicious when key/value pairs that are different than key/value pairs associated with the previous transaction are updated for the transaction proposal.

7. A method, comprising:
    inserting agent code into application code of a software application and compiling the agent code with the application code to integrate an agent into the software application with monitoring rules for monitoring blockchain transaction submissions from the software application to a smart contract on blockchain ledger of a blockchain network based on the monitoring rules;
    receiving, from the agent, a blockchain transaction submitted by the software application to the smart contract during a monitoring by the agent;
    obtaining external data from a repository external to the blockchain network;
    identifying that a pattern of accessing an external data store by the smart contract is anomalous based on the external data;
    generating a decision to block the received blockchain transaction from being stored on the blockchain ledger based on the identified anomalous pattern; and
    transmitting, by a committer node, a notice of rejection of the blockchain transaction to a client application that submitted the blockchain transaction.

8. The method of claim 7, further comprising:
    simulating, by an endorser node of the blockchain network, the blockchain transaction.

9. The method of claim 8, wherein a blockchain transaction comprises one or more of:
    an identity of an originator of the blockchain transaction, and
    an indication of an amount of data affected by the blockchain transaction, and
    an indication of whether risk scoring is to be applied to the blockchain transaction.

10. The method of claim 7, wherein the method further comprises:
obtaining a transaction history for previous transactions, and obtaining shared data from one or more other nodes of the blockchain network.

11. The method of claim 10, wherein the transaction history comprises one or more of:
information identifying when a same blockchain transaction was previously invoked,
information identifying a frequency at which the same blockchain transaction was previously invoked,
information identifying one or more key-value pairs or a range of key-value pairs updated when the same blockchain transaction was previously invoked, and
information identifying a length of time the same blockchain transaction ran during the previous invocation.

12. The method of claim 10, wherein the method further comprises:
identifying that a blockchain transaction proposal is for a transaction that is the same as a previous transaction,
identifying key/value pairs associated with the previous transaction, and
identifying the blockchain transaction proposal as suspicious when key/value pairs that are different than key/value pairs associated with the previous transaction are updated for the blockchain transaction proposal.

13. A non-transitory computer readable medium comprising one or more instructions that when executed by one or more processors cause a computer to perform:
inserting agent code into application code of a software application and compiling the agent code with the application code to integrate an agent into the software application with monitoring rules for monitoring blockchain transaction submissions from the software application to a smart contract on blockchain ledger of a blockchain network based on the monitoring rules;
receiving, from the agent, a blockchain transaction submitted by the software application to the smart contract during a monitoring by the agent;
obtaining external data from a repository external to the blockchain network;
identifying that a pattern of accessing an external data store by the smart contract is anomalous based on the external data;
generating a decision to block the received blockchain transaction from being stored on the blockchain ledger based on the identified anomalous pattern; and
transmitting, by a committer node, a notice of rejection of the blockchain transaction to a client application that submitted the blockchain transaction.

14. The non-transitory computer readable medium of claim 13, wherein a blockchain transaction comprises one or more of:
an identity of an originator of the blockchain transaction, and
an indication of an amount of data affected by the blockchain transaction, and
an indication of whether risk scoring is to be applied to the blockchain transaction.

15. The non-transitory computer readable medium of claim 13, wherein the one or more instructions further cause the one or more processors to perform:
obtaining a transaction history for previous transactions, and
obtaining shared data from one or more other nodes of the blockchain network.

16. The non-transitory computer readable medium of claim 15, wherein the transaction history comprises one or more of:
information identifying when a same blockchain transaction was previously invoked,
information identifying a frequency at which the same blockchain transaction was previously invoked,
information identifying one or more key-value pairs or a range of key-value pairs updated when the same blockchain transaction was previously invoked, and
information identifying a length of time the same blockchain transaction ran during the previous invocation.

17. The non-transitory computer readable medium of claim 15, wherein the one or more instructions further cause the one or more processors to perform:
identifying that a blockchain transaction proposal is for a transaction that is the same as a previous transaction,
identifying key/value pairs associated with the previous transaction, and
identifying the blockchain transaction proposal as suspicious when key/value pairs that are different than key/value pairs associated with the previous transaction are updated for the blockchain transaction proposal.

* * * * *